United States Patent Office 2,792,298
Patented May 14, 1957

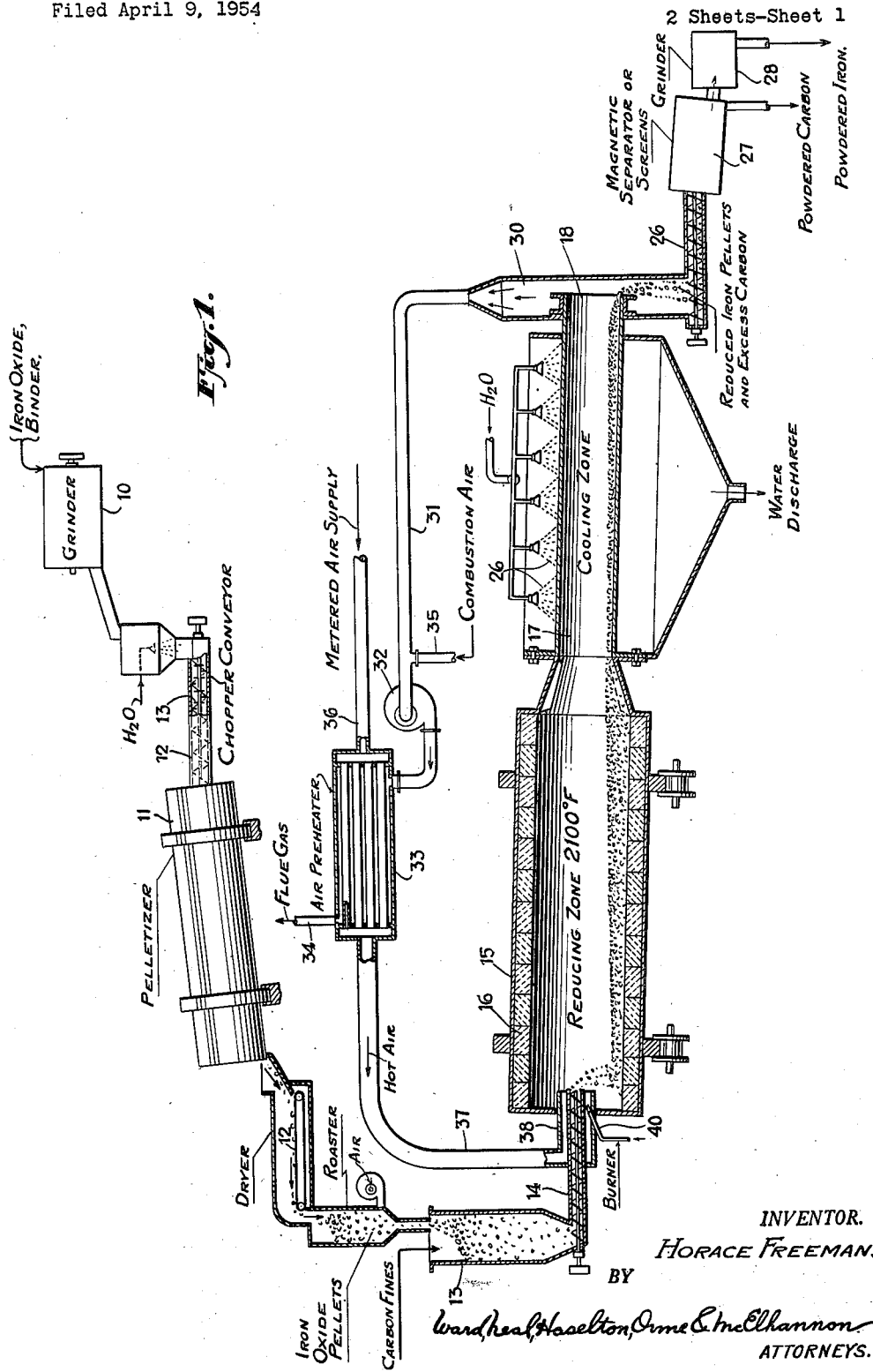

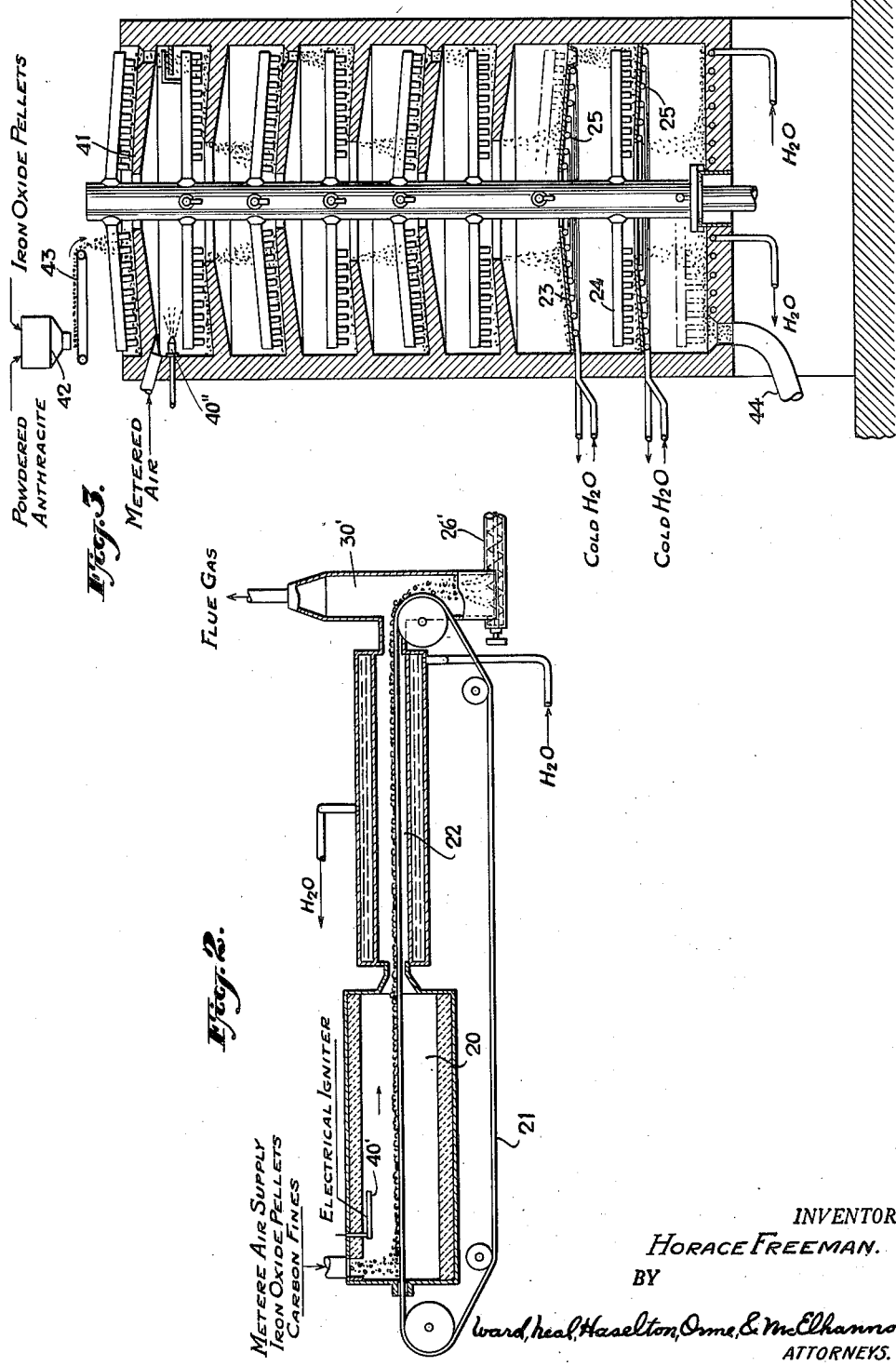

2,792,298

IRON OXIDE REDUCTION

Horace Freeman, Cap-de-la-Madeleine, Quebec, Canada

Application April 9, 1954, Serial No. 422,187

13 Claims. (Cl. 75—3)

This invention relates to processes for directly reducing iron ores and other iron oxides by means of carbon or carbonaceous material to form iron, and more particularly pellets of sponge iron which may be ground to form iron powder or used as melting stock.

Heretofore efforts to continuously and directly reduce iron oxide to form sponge iron or the like in rotary kilns or other furnaces, have involved excessive expenses for fuel and the serious difficulties that the furnace charge would sinter and stick in lumps and to the furnace walls, forming agglomerates or a product still embodying considerable amounts of oxide, ash and of the carbon used as reducing agent and as fuel.

The present invention, however, provides an economical method of overcoming these difficulties and making possible the direct and substantially complete reduction of iron oxide to sponge iron containing for example from 0.01 to 0.2% of carbon and free of any particles or masses of the carbon used as fuel, or the ash thereof.

Briefly the present invention involves first grinding the iron oxide or ore to a powder and then forming same into pellets. Such pellets are fed into a rotary kiln or other suitable furnace along with fine carbon material of a nature such that its ash does not fuse or sinter at the reaction temperature in the furnace (1900–2100° F.) Air is admitted to the furnace at a rate limited so as to provide only enough to react with the amount of carbon necessary to produce the heat required for reducing all of the iron oxide to iron. Some excess carbon is introduced and discharged from the furnace with the reduced sponge iron pellets, but such excess is readily separated from the pellets by screening or by magnetic separation. The excess carbon in the furnace acts promptly to reduce the carbon dioxide formed by the reaction, to carbon monoxide, so that the pellets remain in an atmosphere in the furnace largely constituting nitrogen and carbon monoxide, until they are reduced to sponge iron. Then the pellets, together with the excess carbon, are advanced through a cooling zone while still remaining in an atmosphere largely comprising nitrogen and carbon monoxide until the mixture is cooled sufficiently so that it may be discharged without danger of re-oxidation of the iron.

In order to absorb any volatile sulphur compounds which may be evolved upon the heating of the carbon fuel used, and so that the sulphur may not enter the reduced iron, an amount of lime, lime hydrate, limestone or dolomite, for example, amounting to about 2 to 20% by weight of the carbon, is preferably added to the furnace charge.

In order to cause the carbon more readily to react with the oxygen of the air in the furnace, whereby higher concentrations of carbon monoxide may be maintained at lower temperatures, a small amount of a catalyst such as sodium carbonate or sodium aluminate is also preferably added to the charge. This enables higher concentrations of the monoxide to be obtained than would be possible without the use of such a catalyst, thereby making it possible to obtain complete reduction of the iron oxide at temperatures well below the fusion point of the ash of the carbon used. The amount of sodium carbonate may vary from about 0.5 to 1% by weight of the carbon used. The carbon, preferably in the form of anthracite coal fines, together with the lime or limestone or dolomite and sodium carbonate, are mixed and ground together preferably to a fineness to pass a 20 mesh screen, for example.

Other and more specific objects, features and advantages of the invention will appear from the detailed description given below taken in connection with the accompanying drawings which form a part of this specification and illustrate by way of example several forms of apparatus which may be used in carrying out the invention.

In the drawings:

Fig. 1 is a diagrammatic view of the presently preferred arrangement of apparatus for carrying out the invention, the reducing zone with this apparatus constituting a rotary kiln;

Fig. 2 illustrates somewhat schematically, an alternative form of tunnel-like furnace with a conveyor therethrough which may be substituted for the rotary kiln arrangement of Fig. 1; and Fig. 3 shows somewhat schematically in vertical section a Herreshoff type of rotary rabble furnace which may in some cases be used in lieu of the rotary kiln arrangement.

The iron ore or oxide to be reduced may be in any well known form, such as magnetite, its industrial counterpart rolling mill scale, or it may comprise the iron oxide cinder resulting from the combustion of iron sulphide ores, for example by flash roasting in the recovery of sulphur dioxide from such sulphide ores. Such cinder is presently available at low cost in large quantities for which there is little or no market, yet despite its sulphur content, it may be economically used in carrying out the present invention, since the sulphur will be roasted off in the process. The invention has been carried out in one of its embodiments by the use of ordinary commercially available rolling mill scale, and in another embodiment by using a high grade Brazilian hematite ore. The oxide used may or may not contain appreciably quantities of non-ferrous material such as silica gangue without unduly interfering with the process, except that it is understood that if highly pure iron is required, a highly pure oxide or ore should be used initially.

In any case, the iron oxide used is first finely ground, either in wet or dry condition, for example in a ball mill 10 or other suitable grinding equipment and to the degree of fineness required for forming pellets thereof, such fineness, however, not being particularly critical. It is preferable to add a binding material during the grinding if it is to be done dry, or after the grinding if it is done wet. It is preferable that the ground product contain sufficient fine material which will pass a one-hundred mesh screen or finer, so that the later pelleting or briquetting operation will proceed efficiently, a proportion of fine material aiding such formation. Pelleting is accomplished (and is preferred to briquetting) by adding 10% of water to the dry material, or by dewatering to 10% moisture if it is already wet. The binding material used may comprise ordinary wheat flour, molasses, silicate of soda, sulfite liquor, lime, caustic soda or magnesia, any of which, used in the order of .5% to 2% of the ore weight, will give a sufficiently hard pellet without adding unduly to the impurity of the product. But where high purity of the iron product is required, obviously a binder should be used which will yield as little as possible by way of impurities upon heating of the pellets.

The damp sticky mixture is then fed to a rotating drum as at 11 (which may be similar in construction to that of an ordinary rotary roasting kiln) by a suitable conveyor as at 12 having a jagged feed screw 13 shaped to break or chop the mixture into small pieces which become rounded approximately into spheres by the rolling action as they pass through the drum 11. The size of these spheres or pellets may be controlled by regulating the moisture content of the mixture or by altering the feed screw configuration to change the cutting action and they may be varied from as small as 1/16" in diameter to as large as 1 to 2 inches or more. But the best results, for rapid reduction later in the process, are obtained with smaller pellets of a size in the neighborhood of about 1/8" in diameter or sometimes less. In any case, they should be sufficiently larger than the carbon particles which are to be later mixed therewith, so that they may be cleanly separated from the excess carbon as by screening or otherwise.

Such pellets are damp and soft as first formed, and although they may be dried in the same rotary drum 11 in which they are formed, preferably the drying is completed later with as little agitation as possible to prevent breaking and dust formation. Such drying may be accomplished on a belt conveyor or tunnel dryer at 12.

The dry pellets may be used directly, but I have found it advantageous in some cases to give them a further treatment by roasting them at high temperature. This roasting may be effected without the adition of fuel, if the oxide used is of the magnetic ore type, that is, ferrous oxide. The conversion of ferrous oxide to ferric oxide is accompanied by the generation of heat, under the proper conditions, sufficient to bring the pellets to incipient fusion, the reaction being as follows:

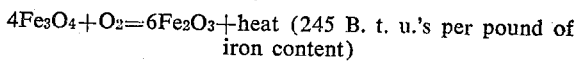
$4Fe_3O_4 + O_2 = 6Fe_2O_3 +$ heat (245 B. t. u.'s per pound of iron content)

To accomplish this, air is blown through a bed or column of the pellets after same have been ignited by an external source of heat. The heat generated by oxidation is sufficiently rapid, if the pellets are of the sizes above mentioned, so that they are brought to incipient fusion at a temperature in the neighborhood of 1500° C. If the column or bed of the pellets is kept in motion as by continuous feed and discharge, there will be no sticking of same together and in cooling they will be extremely hard, porous, somewhat vitreous with some hollow cores. It has been found that pellets so prepared completely resist abrasion in the presence of the coal fines during the reducing process hereinafter described and the pellets now being fully oxidized to the ferric oxide state, it has been found that they are more rapidly reduced that the magnetic forms of oxide.

Either the dried pellets or dried and roasted pellets, if they have been prepared with a binder such as flour or molasses, free from such metallic bases as soda, lime or magnesia, will upon reduction to iron, swell considerably, giving pellets of sponge iron twice as large or larger than the original oxide pellet and though this is advantageous for some uses, as when a very fine, light, porous iron powder is required, it is undesirable for other uses where larger particle size and higher density is required. This swelling may be entirely prevented by using one half of one percent by weight of the ore, either of soda, lime or magnesia as a binding agent in the pelleting operation, with or without the use of organic binders. These bases are found to combine with the iron oxide in the high temperature self-roasting operation with the result, that, in later reduction the pellets do not swell and may be comminuted to give a dense metallic powder of large particle size, due no doubt to the bonds effected by the fused base addition.

It will be obvious that if hematite or ferric oxide be the ore used it is not capable of further oxidation and the pellets thereof will not be self-roasting, but it has been found that if approximately 7% of its weight of the reduced metallic iron powder be added to this type of ore in the grinding operation, it will yield a mixture behaving for the process of this invention as if it were the ferrous or magnetic oxide and is then self-roasting.

A further and important feature of the use of finely divided ore formed into pellets and roasted as above described is that they are freed of any sulphur content in the roasting operation and the finished balls or pellets are substantially round, hard, vitreous but nevertheless extremely permeable to the reducing gases.

Having now formed the pellets as above described, same are then mixed as in a hopper 13 with approximately 40% of their weight of carbon in the form of substantially dry anthracite coal fines of a particle size considerably smaller than the pellets so that the excess may later be readily separated from the reduced pellets by using a screen of a size to retain the pellets and to pass the carbon particles. Anthracite coal fines or any suitable carbon having refractory ash may be used, that is to say ash which, in the presence of additives as described, is infusible at the temperature of reduction.

Preferably anthracite is used since its ash has a high melting point, it is inexpensive, abundant and usually so low in sulphur that only a small addition of lime is required to retain this sulphur from entering the iron. Welsh anthracite as well as Pennsylvania anthracite has been successfully used. It is usually advantageous to add up to one percent of sodium carbonate to the coal since its use greatly increases the concentration of monoxide at temperatures around 1900–2100° F. which are used for reduction. It has further been found that a substantially dry reducing agent, low in volatile hydrocarbons, gives best result since there is not sufficient formation of water vapor in the combustion to effect condensation in the operation of cooling the reduced iron.

The mixture of pellets and substantially dry coal fines is now fed as by a conveyor 14 to the charging end of the reduction furnace. A rotating kiln as at 15 is preferred, which may be of alloy steel externally heat insulated and used without a refractory lining or it may be a suitably insulated steel kiln with a brick lining as at 16. Such a rotary kiln has an extension 17 which is suitably water cooled as by sprays 26 and in which extension the reduced pellets, excess carbon and the protecting gas resulting from the reaction, travel together to the discharge end 18.

A stationary tunnel type furnace as at 20 (Fig. 2) has been used with a continuous moving stainless steel conveyor belt or belt 21 forming a hearth, or having a hearth of vibratory type, and in either case the furnace is provided with a water cooled prolongation as at 22. Alternatively the well known Herreshoff type of multiple hearth furnace may be used as shown in Fig. 3 having hearths superimposed one above another and with rotatable rabbles to cause the charge to move from the top down and across successively lower hearths, the lowest of which as at 23 may be water cooled by cooling coils 25.

Whichever type of furnace be used it is essential that its cooling prolongation or section be connected directly with a gas tight connection to the heating section of the furnace so that as the reduced (iron) pellets and excess coal pass from the heat reducing zone they travel preferably cocurrently with the exit gases into and through this cooling section and are therefore cooled nearly to atmospheric temperature in the same gas composition (as to $CO:CO_2$ ratio) as was developed at the end of the reduction zone. Testing of the gases for the ratio of CO to $CO_2$ content will indicate if a sufficiently high carbon monoxide content is being maintained during the cooling so that the surfaces of the pellets are not reoxidized in the cooling process. If the ratio of carbon monoxide to carbon dioxide be as 2:1 at the end of the reducing zone and no air or oxygen be admitted to the cooling zone, then this gas composition will continue to be reducing towards the pellets as they cool and they will discharge to the atmosphere without oxidation. They may be carried by conveyor 26 to suitable screening or magnetic separating apparatus 27 to be therein separated from the excess coal and become substantially free from carbon. The pellets may then be ground to form iron powder, in a grinder 28. It has been found that large quantities of pellets so prepared will contain not more than 0.2% carbon and may have as low as 0.01% carbon.

The heated reducing section may be of any desirable length or diameter, according to capacity required, but its speed of rotation (for example 1 R. P. M.) and rate of feed requires a time of travel in the reducing zone of not less than about 80 minutes if the pellets are as small as 1/16" in diameter, while pellets as large as 2" in diameter require somewhat in excess of 2 hours for complete reduction.

Carbon dioxide which is formed in diminishing quantity as the charge proceeds toward the discharge end is reduced to monoxide by the excess of hot carbon particles.

It is found that by charging in this manner the temperature may be maintained without difficulty at the desired reducing level (1900-2100° F.) throughout the length of the furnace by means of a single controlled supply of air at the inlet end, since the heat rapidly generated at the charging end is rapidly absorbed by the cold charge and by the heat absorbing reaction at that end, while the monoxide formed acting upon the hot, nearly reduced pellets toward the discharge end evolves heat, which is however counteracted by the heat absorbing reduction of the carbon dioxide by still hot carbon at that end.

The gases leaving the cooling zone at outlet 18 are received in a housing 30 and are drawn through a duct 31 by a blower 32 from which they pass through an air preheater 33 to a flue connection 34. Since the gases from the process have a substantial carbon monoxide content, combustion air is preferably introduced as through a connection 35 to permit burning of such monoxide before the gases are discharged from the flue.

The air which is introduced into the reducing zone is supplied through any suitable metering means, through a duct 36, and is preheated in the preheater 33 before being carried into duct 37 from which the air may be discharged into the furnace through an intake pipe 38 surrounding and concentric with the conveyor 14.

As indicated at 40, the intake end of the furnace may be equipped with a suitable oil or gas burner for use in bringing the interior of the furnace up to the required temperature, for example 1900-2100° F., for starting operations. But after the reducing reaction is properly started, the operation of the burner is discontinued. Although the gases in the furnace travel preferably cocurrent with the material of the charge, it will be found that the intake region within the furnace will be maintained at the required ignition temperature due to reverberatory action from the wall or roof of the furnace at the charging end and the fact that hot portions of the charge, as agitated in the furnace, will partially fall back toward the intake region.

It will be understood that the conveyor tunnel type of furnace of Fig. 2 may be fed if desired in the same manner as the rotary kiln of Fig. 1 and that the gases at the exit end may be received in a housing as at 30' and then conducted to a preheater before going to the flue, the same as in Fig. 1. And the product from the furnace of Fig. 2 may be carried by a conveyor 26' to screening and grinding means as per Fig. 1.

In the furnace of Fig. 2 electrical heaters, for example, as at 40', may be installed for bringing the furnace up to the required starting temperature and in the furnace of Fig. 3 a burner as at 40" may be provided for the same purpose. In the latter furnace the upper hearth 41, if desired, may be used for preheating the charge as received from a hopper 42 and a conveyor 43. The exit gases and the mixture coming out of the outlet conduit 44 of the furnace of Fig. 3 may be treated the same as with the furnaces of Figs. 1 and 2. If desired, instead of metering the air supply to each of the furnaces before the air enters, the rate of air supply may be regulated merely by varying the speed or capacity of the blower which supplies the air.

An important aspect of the present invention involves the relative rates at which the pellets, carbon, and more particularly the air, are introduced into the furnace. It is known that when solid carbon is used for reducing iron ores at any temperature below the melting point of the iron, the reaction does not proceed by the direct action of solid carbon upon iron oxide but as the result of a prior conversion of the carbon to gaseous carbon monoxide. The actual reduction of the iron oxide is effected by the action of this gas upon the ore particles, resulting in metallic iron and carbon dioxide as the direct products. For the reaction to proceed to completion enough heat must be supplied to reduce such carbon dioxide to monoxide by means of free carbon.

The reaction of carbon monoxide upon iron oxides is known to be exothermic provided the gas used and the iron ore be preheated to the temperature of reaction (1900-2100° F.) and the temperature of the product (iron) will rise. It is known that a considerable excess of carbon monoxide must be utilized to complete the reduction, in the absence of hot solid carbon, and the excess required is an obstacle to the economic use of separately prepared monoxide (such as monoxide from a gas producer) upon iron ores in the absence of free carbon.

With the present invention the carbon in the mixture is ignited and the air supply is so controlled that the carbon is burned to carbon monoxide while developing enough heat in the process to supply that which is required to bring the coal, the air and the pellets to the reacting temperature and also that which is required to complete the reduction reaction, according to the heat requirements of the reaction of carbon upon iron oxide.

When solid carbon is used to reduce iron oxide the total heat required when commencing with cold raw materials is 1800 B. t. u.'s per pound of iron produced. If the heat be generated within the charge by causing combustion to proceed in such manner that only carbon monoxide be generated as follows:

$$2C + O_2 = 2CO$$

there will be generated approximately 4400 B. t. u.'s per pound of carbon oxidized. Thus for each 100 pounds of ore pellets in the charge there will be required, if the ore be considered as pure hematite containing 70% iron, $100 \times .70 \times 1800$ B. t. u.'s to reduce all the oxide to metal = 126,000 B. t. u.'s and this will be provided by the combustion of

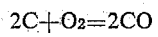

$$\frac{126{,}000}{4{,}400} = 28.6 \text{ lbs. of carbon}$$

(But an excess of carbon amounting preferably to about 12 additional pounds of coal is used for reasons further explained below.) The combustion of this 28.6 lbs. of carbon requires the use of approximately 75 cubic feet of air for each pound of carbon and therefore air is blown in the charging end or drawn through by induced draft at the discharge end and controlled by an analysis of the discharge gases, so that it may be proportioned to the amount of coal and pellets being charged. The exact amount of air may be regulated by observing the nature of the pellets discharging from the cooler as well as by gas analysis.

If the pellets show incipient fusion of the metal the reduction temperature will be too high and it may be lowered by restricting the air, or the temperature thereof, and conversely if the pellets are not sufficiently well reduced, the temperature is too low and may be corrected accordingly.

By generating the required heat in this manner, the charge will be heated to reacting temperature and it is important to note that the reduction will commence at the charging end where the greatest amount of heat is required and where it can rapidly be absorbed. Such reduction is effected by the gaseous diffusion of monoxide into the porous pellets with simultaneous generation of heat within the pellets and the evolution of carbon dioxide. In order that the reduction may continue to completion, however, it is necessary to maintain a high concentration of monoxide in the gases surrounding the pellets. This may be done by renewing or changing the supply of monoxide but, in this process, is effected by having present with the partially and completely reduced pellets an excess of hot carbon particles which serve to reduce the carbon dioxide as fast as it is diffused from the pellets.

A further function of the coal particles and of the refractory ash particles is that they serve as an unfused interfering phase between pellets of reduced iron and prevent them from sintering together, or from adhering to the walls of the furnace, or to the furnace conveyor, if such be used.

It has been found in practice that the use of 40 lbs. (or in some cases from 35–50 lbs.) of carbon if in the form of the finely grounded anthracite, is ample to provide the required excess when used for example with 100 lbs. of pure hematite. Anthracite fines or coke which may be sufficiently reactive without the addition of a catalytic agent and also be sufficiently low in sulphur content that same also may not need the addition of lime as a sulphur retainer. However, it is noted that if the carbon fines are not sufficiently reactive to form monoxide the addition of a catalytic agent such as sodium carbonate, with or without lime, does not materially lower the fusion point of the ash of said mixture and is most effective in maintaining high monoxide concentration.

The well known experience of sintering or sticking of the charge in the operation of furnaces, particularly rotary furnaces, for sponge iron production is due to a variety of causes as follows:

(1) The presence, or production of, oxide fines within the charge resulting in the reduced metal fines becoming reoxidized and fusing together as a partially oxidized mass.

(2) The fusion of the ash of the reducing agent.

(3) The coking of the fuel when such material as raw bituminous coal be used.

With the present invention, however, these effects are avoided (a) by the use of the ore in pellet form, so hard that it is not abraded by the motion of the charge in such furnaces as rotary kilns or multiple hearth furnaces; (b) by the use of non-coking reducing carbon (coal) in such smaller state of division than the pellets of ore, or of reduced iron, that same acts as an interfering phase between the pellets, such reducing agent being selected so that even with the addition of catalytic agent or limestone its ash residue is non-sticky and not fused.

The process of this invention may be distinguished from prior known processes essentially by the following combination of features:

(1) The preventing of sticking or sintering of the charge by preforming the iron oxide into hard pellets which do not disintegrate during the reduction or form fine iron particles, and by using a form of carbon such for example as anthractie, from which the ash has a melting point well above the temperature employed for reduction and which does not adhere to the reduced iron pellets.

(2) Utilizing the carbon reducing agent in such manner that all of the heat required for the reduction of the iron oxide starting with a cold charge, may be provided by burning enough of the carbon in the charge with a limited amount of air to form carbon monoxide and maintaining the preponderance of carbon monoxide in the gases by means of the presence of excess hot free carbon in a finely divided and sufficiently reactive state.

(3) Rapid heating of the pellets and carbon at the charging end of the reduction furnace where most heat is required and advancing the charge preferably although not always necessarily co-current with evolved gases which are maintained with enough carbon monoxide so that a highly effective reducing action on the iron oxide persists, and then cooling the resulting mixture in an atmosphere constituting the gaseous products of the reaction which prevent oxidation of the iron during its cooling.

(4) Separation of the reduced oxide pellets from the excess carbon by insuring that the pellets are so substantially larger than the carbon particles, a complete separation may be accomplished by screening or magnetic means.

The following is an analysis of typical iron products made in accordance with the invention from mill scale:

| | |
|---|---|
| Carbon | 0.01 to 20% maximum. |
| Iron oxide (unreduced) as $Fe_3O_4$. | 0.5 to 1.5% maximum. |
| Sulphur | 0.02 to 0.04%. |
| Phosphorus | 0.03 to 0.06%. |
| Metallic iron | 98.4 to 97.50. |

The mill scale was ground with the addition of one-half of 1% by weight of lime and then made into self-roasted pellests as above described. These pellets were reduced by the process of the invention by adding 35% by weight of anthractite coal thereto which would pass a 60 mesh screen, said coal having been intimately mixed with 0.5% sodium carbonate and 5% of lime hydrate. The resulting pellets of the above stated compositions may be disintegrated to yield iron powder suitable for the purposes of powder metallurgy.

Upon using an exceptionally pure ferric oxide ore, for example one containing less than 0.4% of silica, pellets have been produced and reduced with 35% prepared anthracite, to have the following analysis:

| | |
|---|---|
| Carbon | 0.05 |
| Sulphur | 0.03 |
| Phosphorus | 0.03 |
| Silica | 0.40 |
| $Fe_3O_4$ | 0.75 |
| Metallic iron | 98.74 |
| | 100.00 |

From the above examples it will be seen that the separation of the pellets from the excess coal is complete and that the reduction is substantially complete.

Similar results are obtained if lower grade oxide such as pyrites cinder be used except that although an iron with quite low carbon content is obtained it is less pure due to the gangue, amounting to 5% which is present in the cinder. Such a product would be melted for further refining.

In all cases the pellets obtained are more or less spongy according to the treatment given the pellets before reduction. Pellets which have been made with pure ferric oxide and flour binder and simply dried yield a very spongy product which disintegrates to any extremely fine powder suitable for magnetic core production, while pellets which have been prepared with one half percent addition of alkaline or alkaline earth base and roasted at over 2000° F. yield on reduction a less spongy pellet which disintegrates to a relatively coarse powder more suitable for the fabrication of mechanical parts. All types of the resulting pellets however may be simply melted or pressed into cakes and then melted if solid metal is required.

It will be understood that various alternatives and equivalents may be used for the ingredients of the charge mixed with the oxidized pellets in the furnace. For example, in some cases instead of anthracite coal fines one may use finely divided bituminous coke or petroleum coke, which has an ash with a high melting point. In lieu of the sodium carbonate, one may use not only sodium aluminate but possibly other alkali metal or alkali earth metal carbonates or other catalysts which are known to have the property of intensifying the reaction of carbon with oxygen. Also in lieu of the lime, limestone or dolomite, various other calcium compounds as well as other materials may be used to prevent any sulphur present from entering the reduced iron.

Although preferred embodiments of the invention are herein disclosed for purposes of explanation, various further modifications thereof, after study of the specification, will be apparent to those skilled in the art to which the invention pertains. Reference should accordingly be had to the appended claims in determining the scope of the invention.

What is claimed and desired to be secured by Letters Patent is:

1. Process for reduction of iron oxide to form iron, comprising first taking finely divided iron oxide and forming same into hard porous pellets, mixing such pellets after same have been formed with finely divided carbonaceous material such that when burned will form an ash residue which is infusible at the reduction temperature of the process, the amount of such material being sufficient substantially completely to reduce to iron the iron oxide when reacted therewith and to leave enough excess of carbon for converting carbon dioxide evolved in the reaction, to carbon monoxide and to act as an interfering phase between the pellets, continuously charging such mixture into a furnace, supplying air into the furnace limited to such amount that the atmosphere therein will contain an amount of monoxide equal at least to about twice the carbon dioxide content, allowing the mixture to react at a temperature from about 1900 to about 2100° F. and until the iron oxide is reduced to iron, such temperature being maintained by the heat evolved by the combustion, then conducting the resulting mixture including the reduced iron pellets and gaseous products of reaction into a cooling zone, the atmosphere of which is maintained with an excess of carbon monoxide over dioxide whereby reoxidation of the pellets is avoided, and separating the reduced iron pellets from the remaining carbonaceous material and ash after discharge from said cooling zone.

2. Process for reduction of iron oxide to form sponge iron, which comprises continuously introducing into a furnace the iron oxide in pelletilized form, and also finely divided carbonaceous fuel having a low hydrocarbon content and such that when burned will form a residue which is infusible and does not sinter at the reduction temperature of the process, the amount of such fuel introduced being sufficient substantially completely to reduce to iron the iron oxide when reacted therewith, and to provide an excess of carbon beyond that necessary for converging carbon dioxide as evolved during the reaction largely to carbon monoxide, such finely divided fuel and residue thereof providing an interfering phase between the pellets preventing them from sticking together during their reduction and permitting subsequent separation thereof from the fine material, introducing a supply of air limited to substantially the amount necessary to react with that amount of the carbon present necessary to produce the heat required for reducing all of the oxide to iron, advancing the mixture including the air and gaseous products of combustion co-current through the furnace while allowing the mixture to react at a temperature of from about 1900 to about 2100° F. and until the iron oxide is reduced to iron, and then cooling the resulting mixture including the reduced iron pellets in a non-oxidizing atmosphere.

3. Process in accordance with the foregoing claim 2 and in which a quantity of a finely divided calcium compound amounting to 20% or less by weight of the carbon of the fuel is mixed with the furnace charge, for preventing any sulphur present from entering the reduced iron.

4. Process in accordance with the foregoing claim 2 and in which a small quantity of finely divided catalyst selected from the group comprising sodium carbonate and sodium aluminate, amounting to about 1% or less by weight of the fuel, is mixed with the furnace charge whereby higher concentrations of carbon monoxide may be maintained at lower temperatures in the furnace.

5. Process for reduction of iron oxide to form sponge iron, which comprises continuously introducing the iron oxide in pelletilized form into a furnace with finely divided carbonaceous fuel having a low hydrocarbon content and such that when burned will form a residue which is infusible and does not sinter at the reduction temperature of the process, the amount of such fuel introduced being sufficient substantially completely to reduce to iron the iron oxide when reacted therewith, and to provide an excess of carbon beyond the amount required for converting carbon dioxide as evolved during the reaction largely to carbon monoxide, introducing with the mixture a supply of air limited to substantially the amount necessary to generate about 1800 B. t. u.'s per pound of iron in the charge, by combustion of carbon therein to carbon monoxide, advancing the mixture including the air and gaseous products of combustion co-current through the furnace while allowing the mixture to react at a temperature of from about 1900 to about 2100° F. and until the pelletilized oxide is reduced to iron pellets, and then conducting the resulting mixture including the reduced iron pellets, the excess fuel and residue into a cooling zone and while the pellets are being cooled therein, maintaining same in an atmosphere containing enough of the carbon monoxide evolved from the process to prevent reoxidation of the pellets.

6. Process for the reduction of iron oxide to iron, which comprises continuously introducing the iron oxide in a pelletilized hard porous form into a rotary kiln heated to about 1900–2100° F., together with finely divided anthracite coal, in the proportion of about 100 pounds of the oxide to at least about 35 pounds of the coal, allowing the mixture to react to maintain such temperature range by introducing about 75 cubic feet of air for each pound of carbon in the coal and until the pelletilized oxide is reduced to iron pellets, and then cooling the resulting pellets while maintaining same in a non-oxidizing atmosphere.

7. Process for the reduction of iron oxide to iron, which comprises continuously introducing the iron oxide in a palletilized hard porous form into a furnace heated to about 1900–2100° F., together with finely divided carbonaceous fuel having a low hydrocarbon content and such as when burned will form a residue which does not sinter in said temperature range, the oxide and carbon introduced being in the proportion of about 100 pounds of oxide to at least about 35 pounds of carbon, allowing the mixture to react by introducing only enough air to maintain the temperature within about said range and until the pelletilized oxide is reduced to iron pellets, and then cooling the resulting pellets while maintaining same in an atmosphere which is non-oxidizing in respect thereto.

8. Method for forming porous iron oxide pellets of a form adapted to be directly reduced to sponge iron on mixing and reacting with carbonaceous material, which method comprises mixing with a mass of finely divided iron oxide which is incompletely oxidized, a small amount of a binder material and a small amount of material selected from the group comprising soda ash, lime and magnesia, and also adding sufficient moisture to form a somewhat adherent mass, separating such mass into small lumps, forming such lumps into rounded pellets by advancing same through a rotating drum, igniting a mass of such pellets in a current of air and allowing the resulting heat of oxidation to heat same to the point of incipient fusion and until same become hard and are largely oxidized to ferric oxide.

9. Method for forming hard porous somewhat crystallized partially hollowed iron oxide pellets, which comprises mixing with finely divided ferrous oxide a small amount of a binder material and of a metallic base material together with sufficient moisture to form a somewhat adherent mass, separating said mass into small lumps, forming such lumps into rounded pellets by advancing same through a rotating drum, then igniting a mass of the resulting pellets in a current of air and allowing the resulting heat of oxidation to bring same to substantially the temperature of incipient fusion and until the same are oxidized to ferric oxide.

10. Method for forming hard porous iron oxide pellets of a form adapted to be directly reduced to iron on mixing and reacting with carbonaceous material, which method comprises mixing with a mass of finely divided ferric oxide a small quantity of powdered iron amounting to about 7% or less together with a small amount of binder material and sufficient moisture to form a somewhat adherent mass, separating such mass into small lumps, forming such lumps into rounded pellets by tumbling same in a rotating drum, igniting a mass of such pellets in a current of air and allowing the resulting heat of oxidation of the powdered iron therein to heat same to the point of incipient fusion and until same become hard.

11. Process for reduction of iron oxide to form iron, comprising first taking finely divided iron oxide material which is incompletely oxidized and mixing same with a small quantity of binder material and sufficient moisture to form an adherent mass, separating such mass into small lumps and tumbling such lumps to form rounded pellets, mixing such pellets with finely divided fuel and introducing the mixture into a furnace heated to about 1900–2100° F., the carbonaceous fuel selected being one having a low hydrocarbon content and such as when burned will form a residue which does not sinter in said temperature range, the oxide and carbon being introduced in the furnace in the proportion of about 100 lbs. of oxide to at least about 35 lbs. of carbon, allowing the mixture to react by introducing only enough air to maintain the temperature within about said range and until the pelletilized oxide is reduced to iron pellets, and then cooling the resulting pellets while maintaining same in an atmosphere non-oxidizing in respect thereto.

12. Process in accordance with claim 7 and in which the furnace charge and gaseous products of combustion are advanced co-current through the furnace, and the pellets are cooled in a cooling zone having an atmosphere containing sufficient carbon monoxide evolved in the furnace to be non-oxidizing with respect to the pellets.

13. Process for reduction of iron oxide to form iron by treating the oxide in a furnace with carbonaceous fuel, characterized by first grinding and forming the iron oxide into hardened porous pellets, introducing into the furnace such pelllets and also the fuel in a finely divided form having a low hydrocarbon content and such that when burned will form a residue which is infusible and does not sinter at the reduction temperature of the process, the amount of such fuel introduced being in excess of that required substantially completely to reduce to iron the iron oxide when reacted therewith and to convert the carbon dioxide as evolved during the reaction largely to carbon monoxide, the finely divided fuel and residue thereof being of a character to provide an interfering phase between the pellets preventing them from sticking together during the reaction and permitting subsequent separation thereof from the fine material, also introducing a supply of air limited substantially to the amount necessary to produce upon reacting with the carbon the amount of heat required for reducing substantially all of the oxide to iron, advancing the pellets in admixture with the fuel and fuel residue in the furnace for a time and at a temperature sufficient to reduce the pellets to iron, and cooling the resulting mixture in a non-oxidizing atmosphere.

References Cited in the file of this patent
UNITED STATES PATENTS

| | | |
|---|---|---|
| 1,777,993 | Coley | Oct. 7, 1930 |
| 1,937,822 | Jones | Dec. 5, 1933 |
| 2,026,683 | Johannsen | Jan. 7, 1936 |
| 2,112,566 | Hasselbach | Mar. 29, 1938 |